United States Patent
Nagakubo et al.

(10) Patent No.: US 6,661,917 B1
(45) Date of Patent: Dec. 9, 2003

(54) GRADATION CORRECTING APPARATUS

(75) Inventors: Tetsuro Nagakubo, Yamanashi (JP); Hirofumi Honda, Yamanashi (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/567,079

(22) Filed: May 8, 2000

(30) Foreign Application Priority Data

May 12, 1999 (JP) ............................................ 11-130725

(51) Int. Cl.[7] ............................ G06K 9/00; G06G 5/10; H04N 5/14
(52) U.S. Cl. ........................ 382/169; 382/274; 345/690; 348/672; 358/522
(58) Field of Search ................................. 382/167–169, 382/274; 345/690; 348/671–672; 358/521–522

(56) References Cited

U.S. PATENT DOCUMENTS

| | | | | |
|---|---|---|---|---|
| 5,315,389 A | * | 5/1994 | Izawa et al. ................. | 348/672 |
| 5,517,333 A | * | 5/1996 | Tamura et al. ............... | 358/518 |
| 5,748,802 A | * | 5/1998 | Winkelman .................. | 382/271 |
| 5,828,793 A | * | 10/1998 | Mann ......................... | 382/284 |
| 6,040,860 A | * | 3/2000 | Tamura et al. ............... | 348/252 |
| 6,101,271 A | * | 8/2000 | Yamashita et al. ........... | 382/167 |
| 6,154,288 A | * | 11/2000 | Watanabe ................... | 358/1.9 |
| 6,351,558 B1 | * | 2/2002 | Kuwata ....................... | 382/168 |
| 6,393,148 B1 | * | 5/2002 | Bhaskar ...................... | 382/169 |

FOREIGN PATENT DOCUMENTS

JP 07281633 A * 10/1995 ............ G09G/3/20

OTHER PUBLICATIONS

English Abstract and Machine Translation of JP 07–281633 A, Oct. 27, 1995.*

* cited by examiner

Primary Examiner—Jayanti K. Patel
Assistant Examiner—Christopher Sukhaphadhana
(74) Attorney, Agent, or Firm—Sughrue Mion, PLLC

(57) ABSTRACT

A gradation correcting apparatus which is capable of preventing a luminance distribution from excessively extending over the dynamic range to accomplish an optimal gradation correction in accordance with the partiality of the luminance distribution of a particular video signal. A corrected luminance level is created for each of a plurality of luminance levels based on the frequency data in a luminance distribution such that the luminance distribution of the input luminance signal extends over a predetermined dynamic range, and is stored in an extension correcting table memory. A variance value is calculated for the luminance distribution in accordance with the frequency data to set a mixture ratio based on the variance value. Each of the plurality of luminance levels and the corrected luminance level in the extension correcting table memory corresponding thereto are mixed in the mixture ratio. The mixed level is stored in a look-up table memory as table data corresponding to each of a plurality of luminance levels. The level data corresponding to the luminance level of the input luminance signal is read from the look-up table memory, and output as a gradation corrected luminance signal.

8 Claims, 6 Drawing Sheets

PRIOR ART

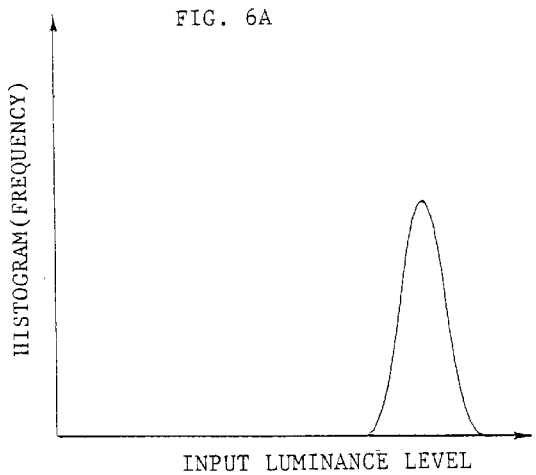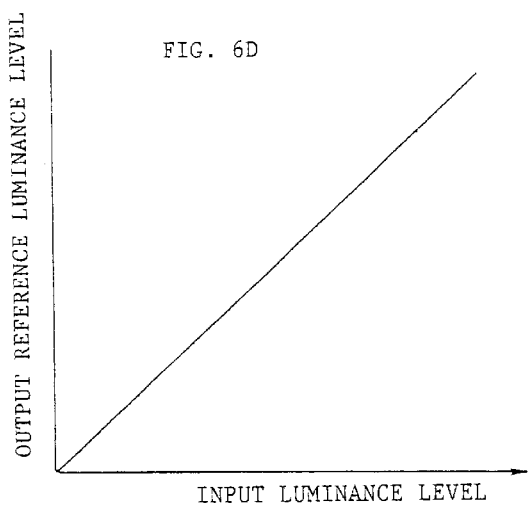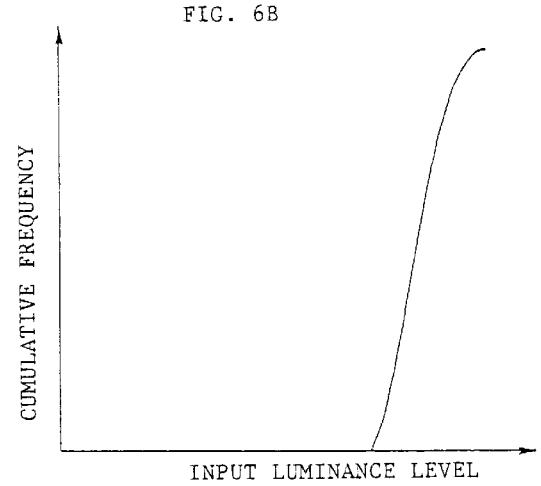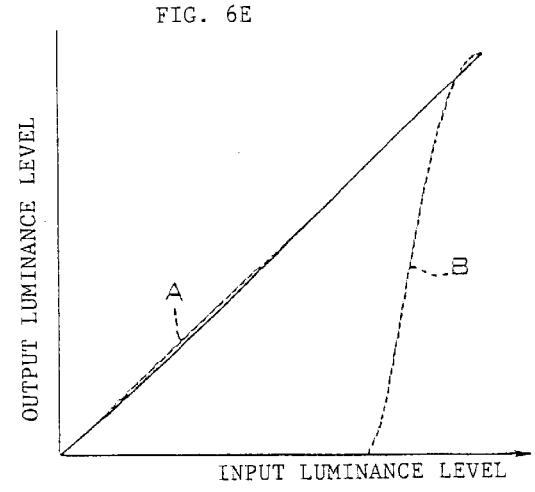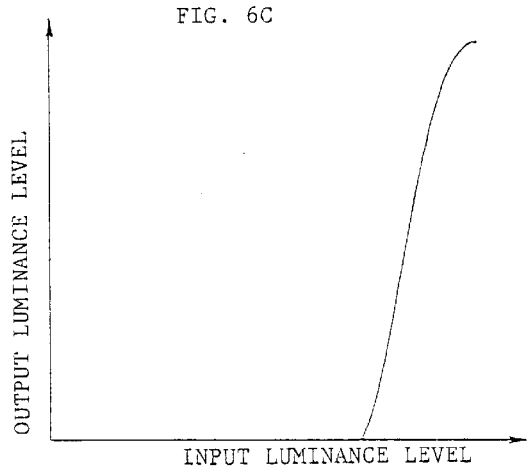

GRADATION CORRECTING APPARATUS

BACKGROUND OF THE INVENTION

1. Field of the Invention

The present invention relates to a gradation correcting apparatus for correcting a luminance gradation of a video signal.

2. Description of the Related Art

In recent years, with the trend of demanding larger displays, the displays are required to have a gradation correcting apparatus for providing clearer images. The gradation correcting apparatus generally corrects a luminance gradation of a video signal by supplying the video signal to a nonlinear amplifier to extend a luminance distribution over the full dynamic range.

FIG. 1 illustrates a conventional gradation correcting apparatus. The illustrated gradation correcting apparatus comprises a histogram memory 1, a maximum correcting value calculating circuit 2, and a look-up table memory 3. The histogram memory 1 and the look-up table memory 3 are supplied with a digitized luminance signal as an input signal. The histogram memory 1, which is a memory for recording a luminance distribution of the input luminance signal, has a storage area for each of a plurality of preset luminance levels. Each storage area is addressed by an associated luminance level to store the frequency of the luminance level. Specifically, as one pixel portion of luminance signal is supplied, the frequency stored in a storage area of the histogram memory 1 corresponding to a luminance level of the signal is incremented by one. Also, the contents stored in the histogram memory 1 is fully cleared to zero every predetermined period (every vertical scanning period or an integer multiple thereof) to record a new luminance distribution.

The maximum correcting value calculating circuit 2 comprises a histogram accumulating circuit 2a for sequentially accumulating data in the histogram memory 1 from the lowest luminance; a cumulative histogram memory 2b for storing the result of the accumulating memory 2a; and a normalization processing circuit 2c for normalizing respective data based on data stored in the cumulative histogram memory 2b such that the largest cumulative frequency is a maximum value for an output luminance signal. The cumulative histogram memory 2b, similar to the histogram memory 1, has a storage area for each of a plurality of luminance levels of a luminance signal, which is addressed by an associated luminance level for storing the frequency thereof.

The look-up table memory 3 stores a normalized version of data stored in the cumulative histogram memory 2b. The look-up table memory 3 is addressed by a luminance level of an input luminance signal, and outputs a luminance level stored in an addressed storage area as a normalized level.

FIGS. 2A to 2C show a luminance converting operation performed by the conventional luminance correcting apparatus as represented by waveforms. For every pixel of an input luminance signal, an address in the histogram memory 1 is specified, and the value stored in a storage area at the specified address is incremented by one. Assume that the frequencies of luminance levels of the input luminance signal for a predetermined period have been detected as shown in FIG. 2A. Here, for facilitating the understanding, assume that the frequencies of luminance levels $Y_{150}$, $Y_{160}$, $Y_{170}$, $Y_{180}$, $Y_{190}$, $Y_{200}$, $Y_{210}$ have been detected in the histogram memory 1, where a relationship $Y_{150} < Y_{160} < Y_{170} < Y_{180} < Y_{190} < Y_{200} < Y_{210}$ is established. When the frequencies of the luminance levels $Y_{150}$, $Y_{160}$, $Y_{170}$, $Y_{180}$, $Y_{190}$, $Y_{200}$, $Y_{210}$ for a predetermined period are 1, 3, 5, 7, 5, 3, 1, the cumulative frequencies are found to be 1, 4, 9, 16, 21, 24, 25 for the luminance levels $Y_{150}$, $Y_{160}$, $Y_{170}$, $Y_{180}$, $Y_{190}$, $Y_{200}$, $Y_{210}$. In other words, the cumulative frequency becomes larger as the luminance level is higher, as shown in FIG. 2B. A normalizing coefficient is calculated in the normalization processing circuit 2c such that a maximum value of the cumulative frequencies is a maximum value of the output luminance levels. The normalizing coefficient is multiplied by each data in the histogram memory 1, and the results of the multiplications are stored in corresponding storage areas in the look-up table memory 3. The relationship between an input luminance level and an output luminance level in the look-up table memory 3 is represented as shown in FIG. 2C. By passing the input luminance signal through the look-up table memory 3, a gradation corrected luminance signal is output.

In the conventional gradation correcting apparatus as described above, however, since the luminance distribution is extended over the full dynamic range, such gradation correcting processing, if performed on a video such as a television moving image having a partial luminance distribution, would result in the production of a strange image far different from an actual image.

OBJECT AND SUMMARY OF THE INVENTION

It is therefore an object of the present invention to provide a gradation correcting apparatus which is capable of preventing a luminance distribution from excessively extending over the dynamic range to accomplish an optimal gradation correction in accordance with the partiality of the luminance distribution of a particular video signal.

A gradation correcting apparatus according to the present invention includes a histogram memory for creating frequency data for each luminance level of an input luminance signal every predetermined period to store the data therein; an extension correcting table memory for creating a corrected luminance level for each of a plurality of luminance levels based on the frequency data in the histogram memory such that a luminance distribution of the input luminance signal extends over a predetermined dynamic range, and for storing the corrected luminance levels therein; means for calculating a variance value for the luminance distribution in accordance with the frequency data in the histogram memory to set a mixture ratio based on the variance value; mixing means for mixing each of the plurality of luminance levels and the corrected luminance level in the extension correcting table memory corresponding thereto in the mixture ratio; and a look-up table memory for storing the mixed level generated by the mixing means as table data corresponding to each of a plurality of luminance levels, wherein the level data corresponding to the luminance level of the input luminance signal is read from the look-up table memory, and output as a gradation corrected luminance signal.

BRIEF DESCRIPTION OF THE DRAWINGS

FIGS. 6A to 6E are graphs for explaining a gradation correcting operation performed by the apparatus of FIG. 3 when a luminance distribution exhibits a large partiality.

DETAILED DESCRIPTION OF THE EMBODIMENT

One embodiment of the present invention will hereinafter be described in detail with reference to the accompanying drawings.

Figure 1:
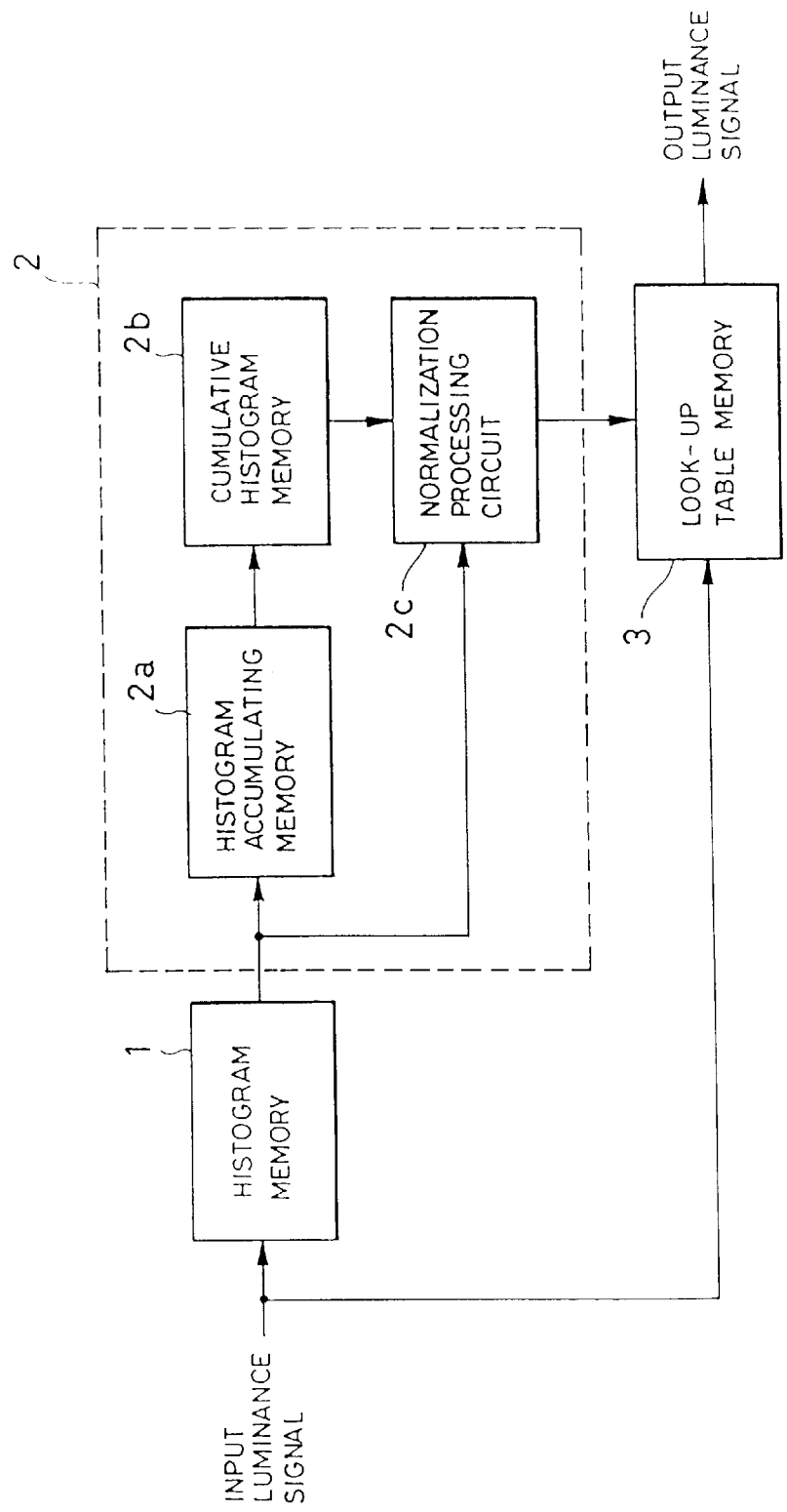
FIG. 1 is a block diagram illustrating a conventional gradation correcting apparatus.
Figure 2A:
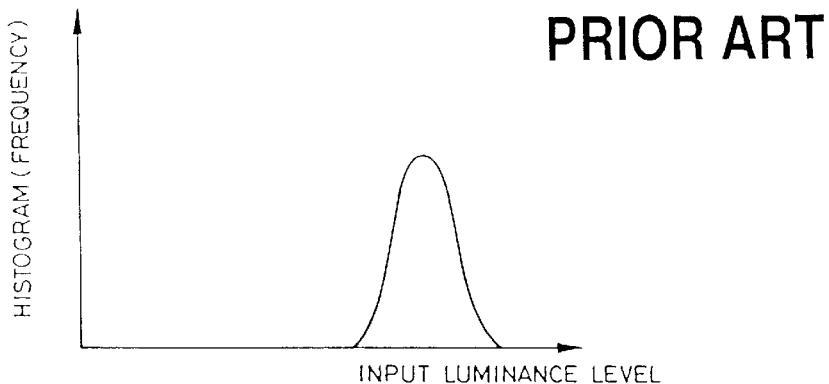
FIGS. 2A to 2C are characteristic graphs for explaining an exemplary operation of the apparatus illustrated in FIG. 1.
Figure 2B:
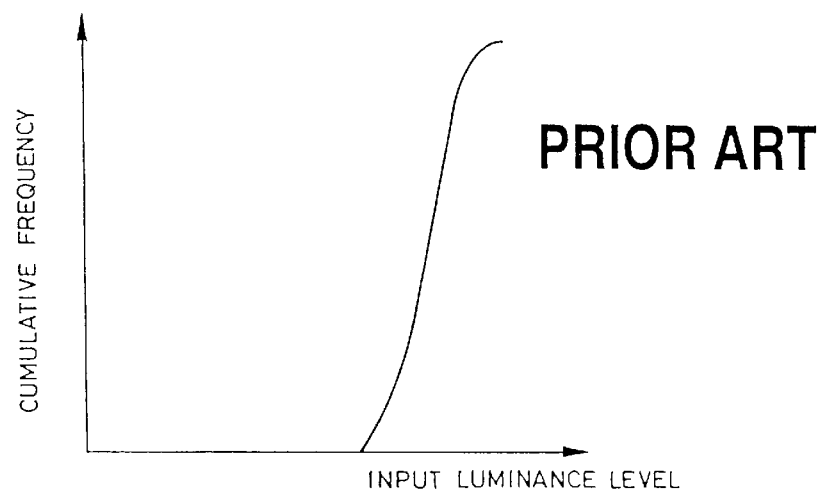
Figure 2C:
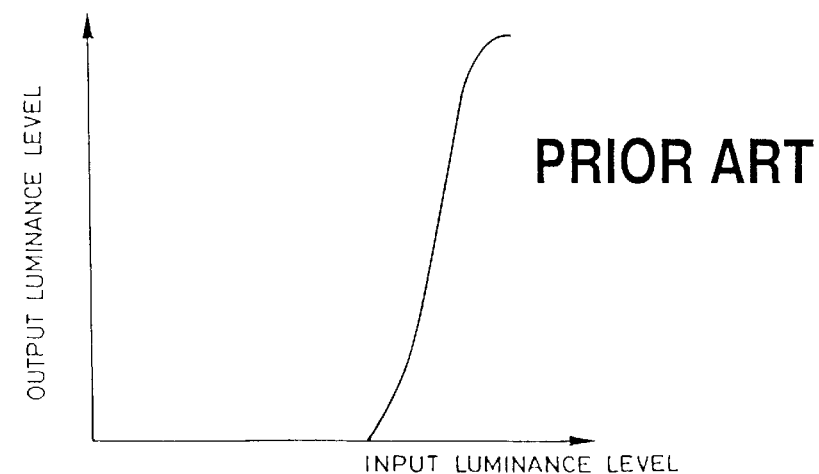
Figure 3:
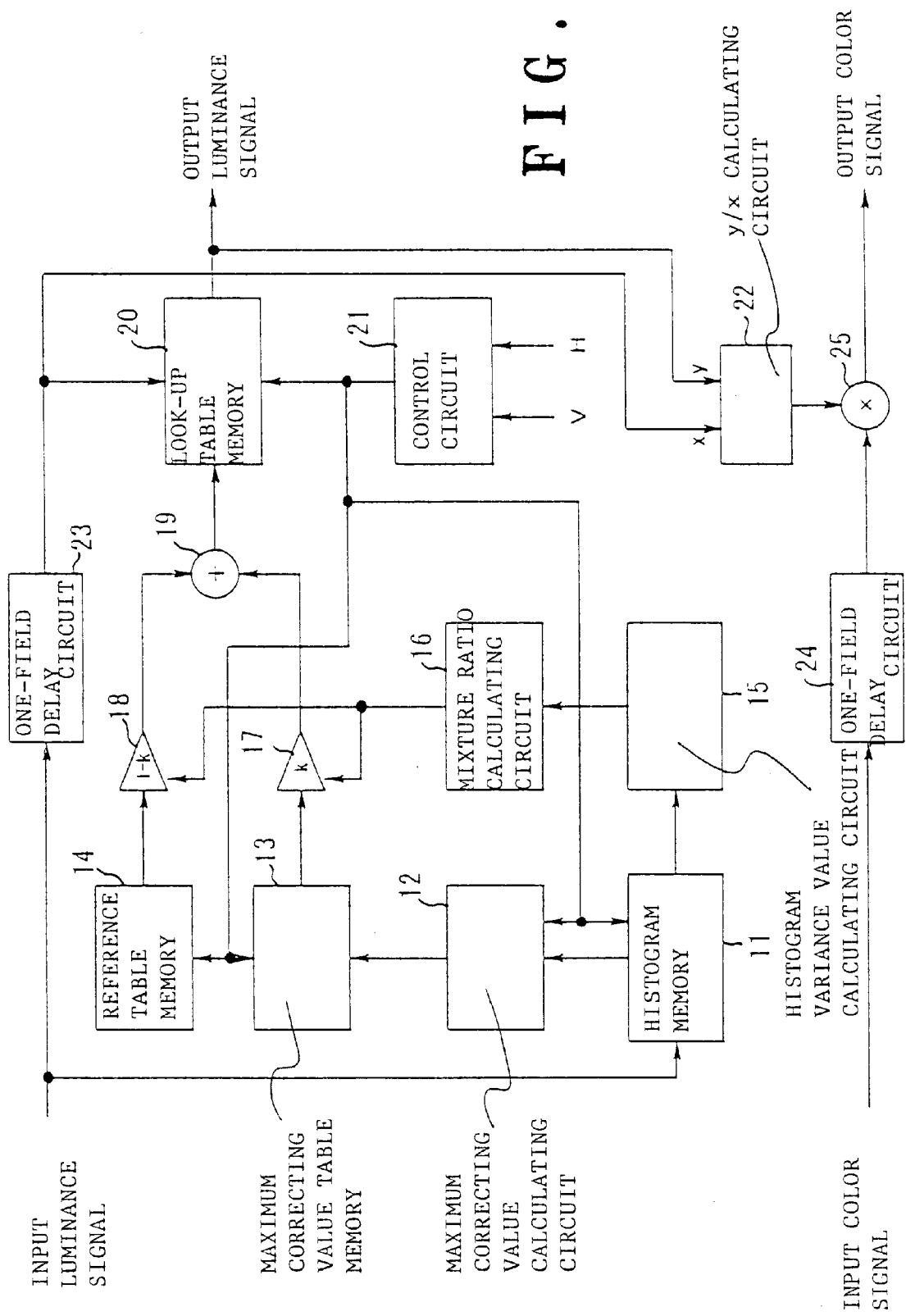
FIG. 3 is a block diagram illustrating an embodiment of the present invention.

FIG. 3 illustrates a gradation correcting apparatus according to the present invention. As can be seen in FIG. 3, this gradation correcting apparatus comprises a histogram memory 11; a maximum correcting value calculating circuit 12; a maximum correcting value table memory 13; a reference table memory 14; a histogram variance value calculating circuit 15; a mixture ratio calculating circuit 16; multipliers 17, 18, 25; an adder 19; a look-up table memory 20; a control circuit 21; a y/x calculating circuit 22; and two one-field delay circuits 23, 24.

The histogram memory 11 is supplied with a digitized luminance signal as an input signal. Like the aforementioned histogram memory 1, the histogram memory 11 is a memory for recording a luminance distribution for the input luminance signal, and has a storage area for each luminance level unit of the luminance signal, which is addressed by an associated luminance level. Each storage area stores the frequency of an associated luminance level. More specifically, as one pixel portion of the luminance signal is supplied, the frequency in a storage area of the histogram memory 11 corresponding to the luminance level of that portion is incremented by one. Also, the contents stored in the histogram memory 1 is fully cleared to zero by the control circuit 21 every one vertical scanning period to record a new luminance distribution.

The maximum correcting value calculating circuit 12, like the maximum correcting value calculating circuit 2, comprises an accumulating circuit for sequentially accumulating data in the histogram memory 11 from the lowest luminance; a cumulative histogram memory for storing the result of the accumulating circuit; a normalization processing circuit for normalizing respective data based on the data stored in the cumulative histogram memory such that a maximum cumulative frequency is a maximum value for an output luminance signal. The cumulative histogram memory is similar to the histogram memory 11 in that it has a frequency storing area for each luminance level unit of a luminance signal, which is addressed by an associated luminance level.

The maximum correcting value table memory (extension correcting table memory) 13 stores a normalized version of data stored in the cumulative histogram memory. The address of the maximum correcting value table memory 13 is specified by a luminance level of an input luminance signal, and a luminance level stored in a storage area of the specified address is output as a normalized level. The luminance level stored in the maximum correcting value table memory 13 is read by the control circuit 21 and supplied to the multiplier 17.

The reference table memory 14 stores a reference luminance level for each luminance level unit of a luminance signal. Specifically, in the reference memory table 14, the reference luminance level has a proportional relationship with an input luminance level. The luminance level stored in the reference memory table 14 is read by the control circuit 21 and supplied to the multiplier 18.

The histogram variance value calculating circuit 15 is connected to the output of the histogram memory 11, and calculates a variance value (partiality of luminance distribution) every vertical scanning period based on the luminance distribution from the histogram memory 11. The mixture ratio calculating circuit 16 is connected to the output of the histogram variance value calculating circuit 15 to calculate a mixture ratio k corresponding to a variance value. The mixture ratio calculating circuit 16 also supplies a coefficient signal indicative of the mixture ratio k (k<1) to the multipliers 17, 18.

The multiplier 17 multiplies a luminance level read from the maximum correcting value table memory 13 by the mixture ratio k, while the multiplier 18 multiplies a luminance level read from the reference table memory 14 by a mixture ratio 1–k. The adder 19 is connected to the respective outputs of the multipliers 17, 18. The adder 19 adds the multiplication results of the multipliers 17, 18 and supplies the addition result to the look-up table memory 20.

The look-up table memory 20 is supplied with an input luminance signal after delayed by the one-field delay circuit 23. The look-up table memory 20 has a storage area addressed by a luminance level of the one-field delayed luminance signal through the one-field delay circuit 23, and reads and outputs data in the addressed storage area. Also, the output data of the adder 19 is written into each storage area of the look-up table memory 20 as a luminance level. The writing is controlled by the control circuit 21.

The control circuit 21 is supplied with a vertical synchronization signal V and a horizontal synchronization signal H for controlling each of the maximum correcting value calculating circuit 12, the maximum correcting value table memory 13, the reference table memory 14 and the look-up table memory 20.

The storage area of each of the histogram memory 11, the cumulative histogram memory in the maximum correcting value calculating circuit 12, the maximum correcting value table memory 13, the reference table memory 14 and the look-up table memory 20 can be specified with a luminance level used as the address, and these memories are provided with a storage area for a change in luminance level.

The y/x calculating circuit 22 outputs the ratio y/x of an output luminance level y of the look-up table memory 20 to the one-field delayed luminance level x through the one-field delay circuit 23 to the multiplier 25 as a correcting coefficient.

The one-field delay circuit 24 receives a digitized input color signal, and outputs the color signal to the multiplier 25 after delaying it by one field. The input color signal and the input luminance signal are separated from the same video signal. The multiplier 25 multiplies the color signal passing through the one-field delay circuit 24 by the output correcting coefficient from the y/x calculating circuit 22 to output a gradation corrected color signal.

In the gradation correcting apparatus configured as described above, one address in the histogram memory 11 is specified by a luminance level of an input luminance signal every pixel of the input luminance signal, and the value in a storage area at the specified address is incremented by one. The histogram memory 11 is formed with a luminance distribution over one vertical scanning period every vertical scanning period. In the maximum correcting value calculating circuit 12, the accumulating circuit records cumulative frequencies based on the luminance distribution over one vertical scanning period, and the result of the accumulating circuit is stored in the cumulative histogram memory 11. A normalizing coefficient is calculated in the normalization processing circuit such that a maximum value of the cumulative frequencies stored in the cumulative histogram memory is a maximum value for the output luminance level. The normalizing coefficient is multiplied by each data in the histogram memory 11, and the multiplication results are stored in corresponding storage areas in the maximum correcting value memory table 13.

The histogram variance value calculating circuit 15 calculates a variance value in accordance with the luminance distribution stored in the histogram memory 11, and the mixture ratio calculating circuit 16 calculates the mixture ratio k corresponding to the variance value.

The control circuit 21 sequentially specifies respective addresses in the maximum correcting value memory table 13 and the reference table memory 14 to read respective luminance levels therefrom. The luminance level read from the maximum correcting value table memory 13 is multiplied by the mixture ratio k in the multiplier 17, while the luminance level read from the reference table memory 14 is multiplied by the mixture ratio 1–k in the multiplier 18. The respective multiplication results are added in the adder 19, and the resulting sum is supplied to the look-up table memory 20. Since the control circuit 21 sequentially specifies addresses to be written in the look-up table memory 20 in synchronism with respective specified addresses in the maximum correcting value table memory 13 and the reference table memory 14 in a vertical blanking period, the output data of the adder 19 is written into a storage area at a specified address in the look-up table memory 20. By repeating the foregoing operation for each address, mixed luminance levels are written into all storage areas of the look-up table memory 20.

Figure 4A:
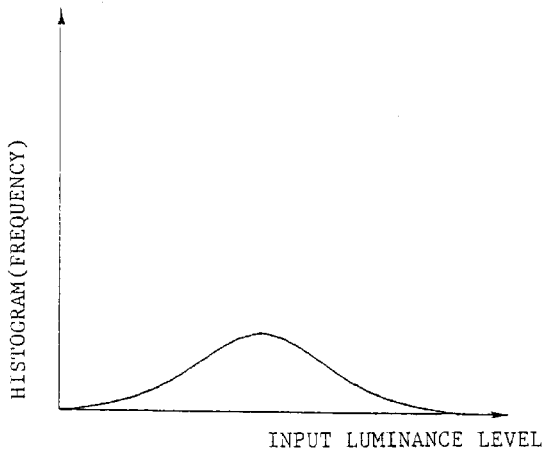
FIGS. 4A to 4E are graphs for explaining a gradation correcting operation performed by the apparatus of FIG. 3 when a luminance distribution exhibits a small partiality.
Figure 4D:
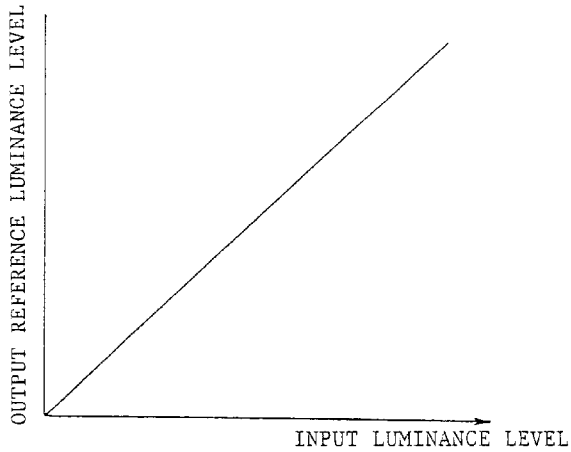
Figure 4B:
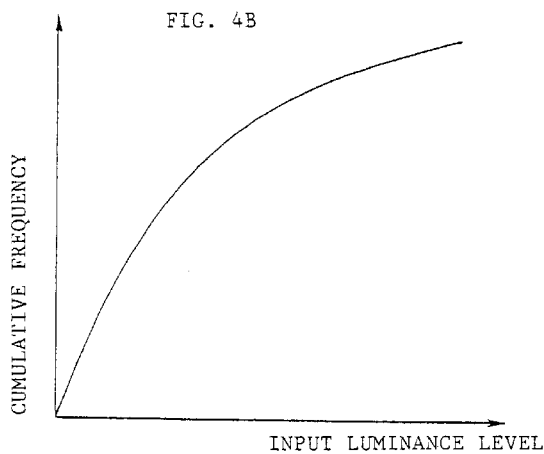
Figure 4E:
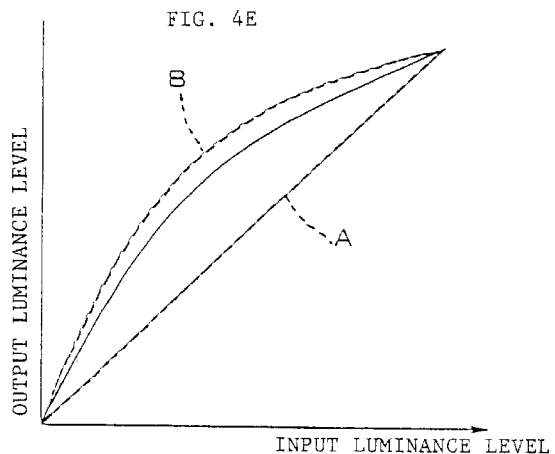
Figure 4C:
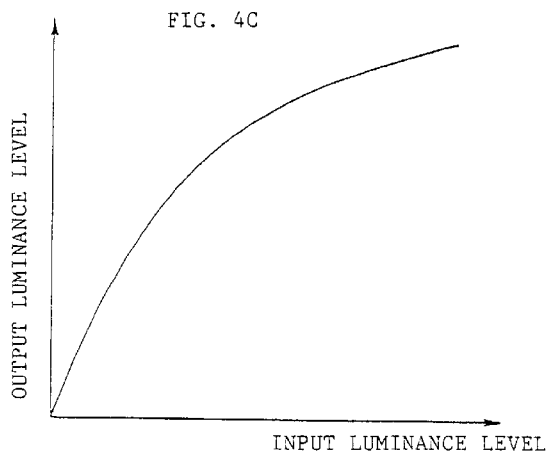

Here, when a luminance distribution stored in the histogram memory 11 is a distribution as shown in FIG. 4A, the luminance distribution exhibits small partiality, so that the variance value is large. Thus, with such a large variance value, the mixture ratio k calculated in the mixture ratio calculating circuit 16 is larger than 0.5 (K>0.5). For the luminance distribution shown in FIG. 4A, the cumulative frequencies of the luminance levels stored in the cumulative histogram memory in the maximum correcting value calculating circuit 12 exhibit the characteristic as shown in FIG. 4B, and an output luminance level with respect to an input luminance level stored in the maximum correcting value table memory 13 exhibits the maximally corrected luminance characteristic as shown in FIG. 4C. The output reference luminance level with respect to the input luminance level stored in the reference table memory 14 exhibits the reference luminance characteristic as shown in FIG. 4D. When K>0.5, the luminance level read from the maximum correcting value table memory 13 and the luminance level read from the reference table memory 14 are mixed with a mixing proportion larger for the luminance level read from the maximum correcting value table memory 13. Thus a mixture luminance level written into the look-up table memory 20 causes the output luminance level with respect to the input luminance level in the look-up table memory 20 to exhibit the characteristic as indicated by a solid line in FIG. 4E. In the characteristics of FIG. 4E, a broken line A indicates the reference luminance characteristic, and a broken line B indicates the maximally corrected luminance characteristic.

Figure 5A:
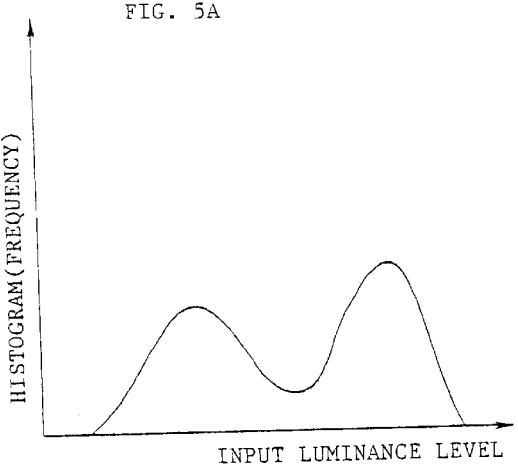
FIGS. 5A to 5E are graphs for explaining a gradation correcting operation performed by the apparatus of FIG. 3 when a luminance distribution exhibits a middle partiality.
Figure 5D:
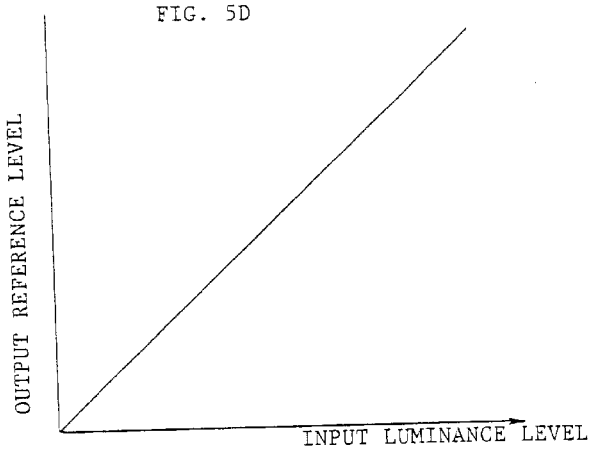
Figure 5B:
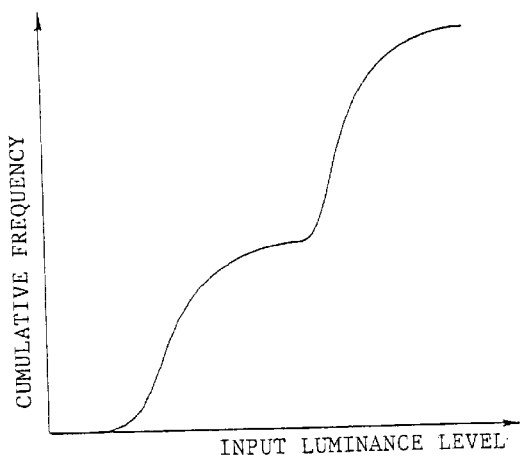
Figure 5E:
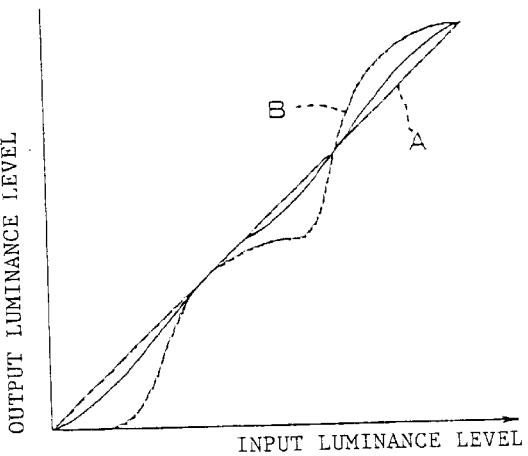
Figure 5C:
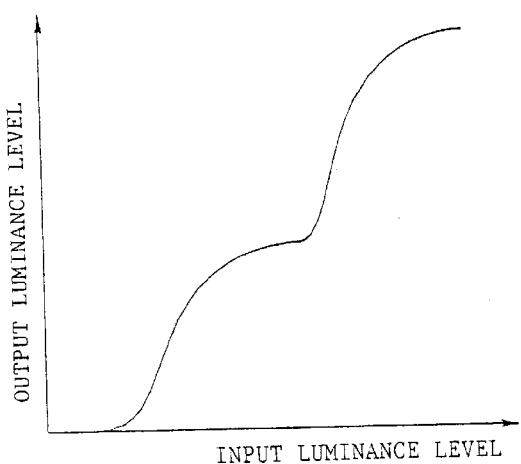

Next, when a luminance distribution stored in the histogram memory 11 is a distribution as shown in FIG. 5A, the luminance distribution exhibits a middle partiality, so that the variance value is middle. Thus, with such a middle variance value, the mixture ratio k calculated in the mixture ratio calculating circuit 16 is substantially equal to 0.5 (k≈0.5). For the luminance distribution shown in FIG. 5A, the cumulative frequencies of the luminance levels stored in the cumulative histogram memory in the maximum correcting value calculating circuit 12 exhibit the characteristic as shown in FIG. 5B, and an output luminance level with respect to an input luminance level stored in the maximum correcting value table memory 13 exhibits the maximally corrected luminance characteristic as shown in FIG. 5C. The output reference luminance level with respect to the input luminance level stored in the reference table memory 14 exhibits the reference luminance characteristic as shown in FIG. 5D. When k≈0.5, the luminance level read from the maximum correcting value table memory 13 and the luminance level read from the reference table memory 14 are mixed in an equal mixing proportion. Thus, a mixture luminance level written into the look-up table memory 20 causes the output luminance level with respect to the input luminance level in the look-up table memory 20 to exhibit the characteristic as indicated by a solid line in FIG. 5E. In the characteristics of FIG. 5E, a broken line A indicates the reference luminance characteristic, and a broken line B indicates the maximally corrected luminance characteristic.

Further, when a luminance distribution stored in the histogram memory 11 is a distribution as shown in FIG. 6A, the luminance distribution exhibits a large partiality, so that the variance value is small. Thus, with such a small variance value, the mixture ratio k calculated in the mixture ratio calculating circuit 16 is smaller than 0.5 (k<0.5). For the luminance distribution shown in FIG. 6A, the cumulative frequencies of the luminance levels stored in the cumulative histogram memory in the maximum correcting value calculating circuit 12 exhibit the characteristic as shown in FIG. 6B, and an output luminance level with respect to an input luminance level stored in the maximum correcting value table memory 13 exhibits the maximally corrected luminance characteristic as shown in FIG. 6C. The output reference luminance level with respect to the input luminance level stored in the reference table memory 14 exhibits the reference luminance characteristic as shown in FIG. 6D. When k<0.5, the luminance level read from the maximum correcting value table memory 13 and the luminance level read from the reference table memory 14 are mixed in the adder 19 with a mixing proportion larger for the luminance level read from the reference table memory 14. Thus, a mixture luminance level written into the look-up table memory 220 causes the output luminance level with respect to the input luminance level in the look-up table memory 20 to exhibit the characteristic as indicated by a solid line in FIG. 6E. In the characteristics of FIG. 6E, a broken line A indicates the reference luminance characteristic, and a broken line B indicates the maximally corrected luminance characteristic.

As described above, in the look-up table memory 20 which stores mixture luminance levels at respective storage area, a luminance level is read from a storage area corresponding to the luminance level of a one-field delayed luminance signal output from the one-field delay circuit 23, and is output as a gradation corrected luminance signal. More specifically, when the luminance distribution exhibits a small partiality, a luminance signal fully extending over the dynamic range is output. Conversely, when the luminance distribution exhibits a large partiality, a luminance signal seldom extending over the dynamic range is output. It is therefore possible to accomplish an optimal gradation correction in accordance with the partiality of the luminance distribution of a particular video signal.

In addition, the gradation corrected luminance signal is divided by an input luminance signal in the y/x calculating circuit 22, and the result is supplied to the multiplier 25 as a correcting coefficient. The correcting coefficient is then multiplied by a one-field delayed color signal in the multiplier 25, thereby correcting the color signal corresponding to the gradation correction performed on the luminance signal.

As described above, according to the present invention, it is possible to prevent the luminance distribution from excessively extending over the dynamic range to accomplish an optimal gradation correction in accordance with the partiality of the luminance distribution of a particular video.

What is claimed is:

1. A gradation correcting apparatus comprising:

a histogram memory for creating frequency data for each luminance level of an input luminance signal every predetermined period to store said data therein;

an extension correcting table memory for creating a corrected luminance level for each of a plurality of luminance levels based on said frequency data in said histogram memory such that a luminance distribution of said input luminance signal extends over a predetermined dynamic range, and for storing said corrected luminance levels therein;

means for calculating a statistical variance value for the luminance distribution in accordance with the frequency data in said histogram memory to set a mixture ratio based on said statistical variance value;

mixing means for mixing other luminance levels and said corrected luminance levels in said extension correcting table memory corresponding thereto in said mixture ratio;

a look-up table memory for storing the mixed level generated by said mixing means as table data corresponding to each of said plurality of luminance levels; and controlling means for reading level data corresponding to each luminance level of said input luminance signal from said look-up table memory, and outputting said level data as a gradation corrected luminance signal.

2. A gradation correcting apparatus according to claim 1, wherein said mixing means sets said mixture ratio to reduce a mixing proportion for said corrected luminance level when said statistical variance value is small, and sets said mixture ratio to increase the mixing proportion for said corrected luminance level when said statistical variance value is large.

3. A gradation correcting apparatus according to claim 1, further comprising means for calculating a correcting coefficient based on said input luminance signal and said gradation corrected luminance signal, and for multiplying an input color signal by said correcting coefficient to generate a gradation corrected color signal.

4. The gradation correcting apparatus according to claim 1, wherein said mixture ratio corresponds to said statistical variance value.

5. The gradation correcting apparatus according to claim 1, wherein said mixing means comprises a plurality of multipliers for multiplying said other luminance levels and said corrected luminance levels, respectively, by said mixture ratio, and an adder for adding together the results of multiplication by said plurality of multipliers.

6. The gradation correcting apparatus according to claim 1, further comprising a reference table memory for storing reference luminance levels as said other luminance levels to be mixed with said corrected luminance levels by said mixing means.

7. A method of correcting a gradation comprising:

creating frequency data for each luminance level of an input luminance signal every predetermined period;

creating a corrected luminance level for each of a plurality of luminance levels based on said frequency data such that a luminance distribution of said input luminance signal extends over a predetermined dynamic range;

calculating a statistical variance value for the luminance distribution in accordance with the frequency data to set a mixture ratio based on said statistical variance value;

mixing other luminance levels and said corrected luminance levels corresponding thereto in said mixture ratio to obtain a mixed level;

storing the mixed level as table data corresponding to each of said plurality of luminance levels;

reading level data corresponding to each luminance level of said input luminance signal; and outputting said level data as a gradation corrected luminance signal.

8. An apparatus comprising:

a memory in which frequency data for each luminance level of an input luminance signal for every predetermined period is stored, wherein a corrected luminance level for each of a plurality of luminance levels is created based on said frequency data, such that a luminance distribution of said input luminance signal extends over a predetermined dynamic range, wherein said corrected luminance levels for said plurality of luminance levels is stored in said memory; and a controller that calculates a statistical variance value for the luminance distribution in accordance with the frequency data in said memory to set a mixture ratio based on said statistical variance value, that mixes other luminance levels and corresponding ones of said corrected luminance levels in said memory based on said mixture ratio to obtain a mixed level, and that reads level data corresponding to each luminance level of said input luminance signal from said memory and outputs said level data as a gradation corrected luminance signal, wherein the mixed level generated by said controller is stored as table data corresponding to each of said plurality of luminance levels.

* * * * *